United States Patent
Roberts et al.

(10) Patent No.: US 9,587,180 B2
(45) Date of Patent: *Mar. 7, 2017

(54) PROCESS FOR MAKING LUBE BASE STOCKS FROM RENEWABLE FEEDS

(71) Applicant: ExxonMobil Research and Engineering Company, Annandale, NJ (US)

(72) Inventors: Virginia M. Roberts, Weehawken, NJ (US); Suzzy Chen Hsi Ho, Princeton, NJ (US); Paul D. Oldenburg, Cypress, TX (US); Michel Daage, Hellertown, PA (US); Kun Wang, Bridgewater, NJ (US); Bradley R. Fingland, Annandale, NJ (US); Patrick Loring Hanks, Bridgewater, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/096,295

(22) Filed: Dec. 4, 2013

(65) Prior Publication Data

US 2014/0171700 A1    Jun. 19, 2014

Related U.S. Application Data

(60) Provisional application No. 61/738,458, filed on Dec. 18, 2012.

(51) Int. Cl.
*C10G 3/00*    (2006.01)
*C10G 45/58*    (2006.01)
(Continued)

(52) U.S. Cl.
CPC ............. *C10G 3/50* (2013.01); *C10G 3/42* (2013.01); *C10G 3/46* (2013.01); *C10G 3/47* (2013.01);
(Continued)

(58) Field of Classification Search
CPC ......... C10G 3/44; C10M 105/04; Y02E 50/13
(Continued)

(56) References Cited

U.S. PATENT DOCUMENTS 3,962,135 A * 6/1976 Alafandi .................. B01J 20/12
502/84
4,076,842 A * 2/1978 Plank ....................... B01J 29/70
423/704

(Continued)

FOREIGN PATENT DOCUMENTS

GB     347543 A       4/1931
WO  2007068795 A1    6/2007
(Continued)

OTHER PUBLICATIONS

The International Search Report and Written Opinion of PCT/US2013/073012 dated Dec. 23, 2014.
(Continued)

*Primary Examiner* — In Suk Bullock
*Assistant Examiner* — Aaron Pierpont
(74) *Attorney, Agent, or Firm* — Robert A. Migliorini

(57) ABSTRACT

Provided are processes for making hydrocarbons from renewable feed sources. In an embodiment, there is provided a method for co-producing lube basestock and transportation fuel from a feedstock of biological origin, the method including: a) converting a feedstock of biological origin to a ketone or a dimer acid in the presence of a first catalyst; and b) hydrogenating the ketone or the dimer acid to produce a hydrocarbon in the presence of a second catalyst compris-
(Continued)

ing a hydrogenation catalyst and a hydrothermally stable binder.

35 Claims, 5 Drawing Sheets

(51) Int. Cl.
*C10G 65/04* (2006.01)
*C10G 65/12* (2006.01)
*C10L 1/04* (2006.01)
*C10L 1/08* (2006.01)
*C10M 109/02* (2006.01)
*C10M 177/00* (2006.01)

(52) U.S. Cl.
CPC .............. *C10G 3/49* (2013.01); *C10G 45/58* (2013.01); *C10G 65/043* (2013.01); *C10G 65/12* (2013.01); *C10L 1/04* (2013.01); *C10L 1/08* (2013.01); *C10M 109/02* (2013.01); *C10M 177/00* (2013.01); *C10G 2300/1011* (2013.01); *C10G 2400/04* (2013.01); *C10G 2400/08* (2013.01); *C10L 2200/0469* (2013.01); *C10L 2270/04* (2013.01); *C10N 2220/022* (2013.01); *C10N 2270/00* (2013.01); *Y02E 50/13* (2013.01); *Y02P 30/20* (2015.11)

(58) Field of Classification Search
USPC .................................. 585/17, 254, 251, 253
See application file for complete search history.

(56) References Cited

U.S. PATENT DOCUMENTS

| | | | |
|---|---|---|---|
| 4,330,302 A * | 5/1982 | Taylor | C10L 1/232 252/401 |
| 6,632,765 B1 * | 10/2003 | Chen | B01J 23/92 502/53 |
| 7,815,694 B2 | 10/2010 | Miller | |
| 7,850,841 B2 | 12/2010 | Koivusalmi et al. | |
| 7,888,542 B2 | 2/2011 | Koivusalmi et al. | |
| 7,960,596 B2 | 6/2011 | Miller | |
| 8,124,572 B2 | 2/2012 | Miller | |
| 8,187,344 B2 | 5/2012 | Jakkula et al. | |
| 2004/0065003 A1 * | 4/2004 | O'Rear | C10L 1/08 44/389 |
| 2004/0108245 A1 * | 6/2004 | Jiang | C10G 45/62 208/27 |
| 2007/0100166 A1 * | 5/2007 | Beavers | B01J 23/02 568/397 |
| 2007/0135663 A1 | 6/2007 | Aalto et al. | |
| 2007/0135669 A1 | 6/2007 | Koivusalmi et al. | |
| 2007/0161832 A1 | 7/2007 | Myllyoja et al. | |
| 2008/0149529 A1 * | 6/2008 | Rosenbaum | C10M 111/04 208/19 |
| 2008/0302001 A1 * | 12/2008 | Koivusalmi | C10G 45/62 44/308 |
| 2009/0014354 A1 | 1/2009 | Knuuttila et al. | |
| 2009/0158637 A1 | 6/2009 | McCall et al. | |
| 2009/0162264 A1 * | 6/2009 | McCall | C10G 45/02 422/187 |
| 2009/0283442 A1 | 11/2009 | McCall et al. | |
| 2010/0018108 A1 | 1/2010 | Miller | |
| 2010/0081809 A1 | 4/2010 | Devarakonda et al. | |
| 2010/0234654 A1 * | 9/2010 | Wang | C07C 29/149 585/254 |
| 2011/0107656 A1 | 5/2011 | Miller | |
| 2011/0259793 A1 * | 10/2011 | Umansky | B01D 3/141 208/89 |
| 2011/0301387 A1 * | 12/2011 | Wang | C07C 37/08 568/798 |
| 2012/0102827 A1 | 5/2012 | Miller | |
| 2012/0102828 A1 | 5/2012 | Miller | |
| 2012/0108869 A1 | 5/2012 | Miller et al. | |
| 2012/0108870 A1 | 5/2012 | Miller | |
| 2012/0108871 A1 | 5/2012 | Miller | |
| 2012/0316093 A1 | 12/2012 | Zhan et al. | |

FOREIGN PATENT DOCUMENTS

| | | | |
|---|---|---|---|
| WO | 2007068797 A2 | 6/2007 | |
| WO | 2007068800 | 6/2007 | |
| WO | WO 2012162403 A1 * | 11/2012 | ............... C10G 3/42 |

OTHER PUBLICATIONS

Bernal, S. et al, "Reversibility of Hydrogen Chemisorption on a Ceria-Supported Rhodium Catalyst," Journal of Catalysis, 1992, vol. 137, pp. 1-11.

* cited by examiner

PROCESS FOR MAKING LUBE BASE STOCKS FROM RENEWABLE FEEDS

CROSS-REFERENCE TO RELATED APPLICATIONS

This application claims priority to U.S. Provisional Application Ser. No. 61/738,458 filed Dec. 18, 2012, herein incorporated by reference in its entirety.

FIELD

The present disclosure relates to improved methods for making fuel and lube stock from renewable feed sources and fuel and lube basestock produced by the methods. More specifically, this disclosure relates to methods for co-producing transportation fuel and lube basestock from renewable feed sources produced by the methods.

BACKGROUND

Lube basestocks are commonly used for the production of lubricants, such as lubricating oils for automobiles, industrial lubricants and lubricating greases. They are also used as process oils, white oils, metal working oils and heat transfer fluids. Finished lubricants consist of two general components, lubricating base oil and additives. Lubricating base oil is the major constituent in these finished lubricants and contributes significantly to the properties of the finished lubricant. In general, a few lubricating base oils are used to manufacture a wide variety of finished lubricants by varying the mixtures of individual lubricating base oils and individual additives.

According to the American Petroleum Institute (API) classifications, lube basestocks are categorized in five groups based on their saturated hydrocarbon content, sulfur level, and viscosity index (Table 1). Lube base oils are typically produced in large scale from non-renewable petroleum sources. Group I, II, and III basestocks are all derived from crude oil via extensive processing, such as solvent extraction, solvent or catalytic dewaxing, and hydroisomerization. Group III base oils can also be produced from synthetic hydrocarbon liquids obtained from natural gas, coal or other fossil resources. Group IV basestocks, the poly(alpha olefins) (PAO), are produced by oligomerization of alpha olefins, such as 1-decene. Group V base oils include everything that does not belong to Groups I-IV, such as naphthenics, polyalkylene glycols (PAG) and esters.

TABLE 1

| | API Classification | | | | |
|---|---|---|---|---|---|
| | Group I | Group II | Group III | Group IV | Group V |
| % Saturates | <90 | ≥90 | ≥90 | Poly alpha-olefins (PAO) | All others not belonging to Group I-IV |
| % S | >0.03 | ≤0.03 | ≤0.03 | | |
| Viscosity Index (VI) | 80-120 | 80-120 | ≥120 | | |

Natural oils derived from biological sources are sometimes used as lubricants, but to a small scale, due to their poor low-temperature properties and hydrolysis instability. The triglyceride esters in natural oils are often hydrolyzed to yield fatty acids, which can be subsequently converted into esters as synthetic lubricants.

For environmental, economical, and regulatory reasons, it is of interest to produce fuels, chemicals, and lube oils from renewable sources of biological origin. So far only esters of renewable and biological origin have been used in applications such as refrigeration compressor lubricants, bio-hydraulic oils and metal working oils. In automotive and industrial lubricants, esters from biological sources are used in very small fractions as additives due to technical problems as well as their high prices. For example, ester base oils can hydrolyze readily producing acids, which in turn cause corrosion on lubricating systems.

In contrast, lube basestocks consisting of hydrocarbons from biological sources do not have those technical problems associated with esters from same sources. Most common biological sources for hydrocarbons are natural oils, which can be derived from plant sources such as canola oil, castor oil, sunflower seed oil, rapeseed oil, peanut oil, soy bean oil, and tall oil, or derived from animal fats. The basic structural unit of natural oils and fats is a triglyceride, which is an ester of glycerol with three fatty acid molecules having the structure below:

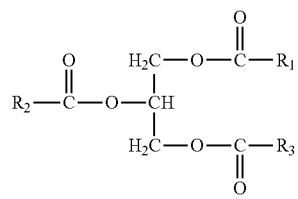

wherein $R_1$, $R_2$, and $R_3$ represent $C_4$-$C_{30}$ hydrocarbon chains. Fatty acids are carboxylic acids containing long linear hydrocarbon chains. Lengths of the hydrocarbon chains most commonly are 18 carbons ($C_{18}$). $C_{18}$ fatty acids are typically bonded to the middle hydroxyl group of glycerol. Typical carbon numbers of the fatty acids linked to the two other hydroxyl groups are even numbers, being between $C_{14}$ and $C_{22}$.

For the purpose of this disclosure, when all the fatty acid chains in a triglyceride have more than 14 carbon atoms, the triglyceride is considered a long-chain fatty acid triglyceride. When one or more of the fatty acid chains in a triglyceride has less than 14 carbon atoms, the triglycerides are considered medium-chain triglycerides.

In the field of fuels, so-called renewable source components are now required both in the US and Europe. Although there is no imminent requirement for lube products currently, generating premium basestocks from renewable sources on a large scale is attractive for the same policy reasons that led to the imposition of regulations in the higher volume fuel area. In fact, with recent advances in biofuels, natural oils are becoming increasingly available as feedstocks that provide fuel value comparable to that of petroleum oils. Converting these bio-feeds to lubes can give significant value uplift.

Also, there is increasing regulatory demand for renewable fuels. For example, airlines operating in Europe will be subjected to the Emission Trading Scheme (ETS) adopted by the EU starting in 2012. The ETS requires airlines to cut $CO_2$ emissions for all flights arriving or departing from EU countries. Using renewable jet fuel is one approach to meet this requirement. Consequently, jet fuel from renewable sources is desired among airlines in Europe. Similarly, renewable diesel is needed to meet government regulations and product specs. Current projections show a large need for renewable diesel in the EU, with significant volume possible in Canada and the United States in the near future.

WO 2007/068800 describes a process for producing a saturated hydrocarbon component from a biological starting material comprising an oligomerization step, an optional prehydrogenation step, a deoxygenation step and an optional hydroisomerization step.

US 2009/0014354 mentions a process for producing base oils from a biological starting material comprising a condensation step selected from ketonization, aldol condensation, alcohol condensation and radical reaction and a combined hydrodefunctionalization and isomerization step under pressure from 0.1 to 15 MPa at the temperature from 100 to 500° C. in the presence of a bifunctional catalyst.

Recent researches focus on chemical transformations in a series of catalytic steps requiring separate reactors for each individual step as well as optimization of conditions in each reactor. Many process steps involve clean-up of a reaction mixture or isolation of a desired product from a mixture. For example, fatty acids and alcohols are produced by hydrolysis of fatty acid triglycerides. Hydrolysis is typically conducted by treating the triglyceride with an acid solution, and is sometimes followed by extraction with an organic solvent, and finally recovery of the organic solvent. The acid is consumed in the process and therefore, hydrolysis can add significant cost to the lube processes disclosed in the art.

US 2010/0018108 describes a method for producing base oil and diesel or other transportation fuel comprising processing a triglyceride-containing vegetable oil to effect oligomerization and deoxygenation of unsaturated fatty acid components contained therein to provide for an oligomerized mixture, isomerizing the oligomerized mixture over an isomerization catalyst to yield an isomerized mixture, and distilling the isomerized mixture to produce a base oil and a diesel fuel.

U.S. Pat. No. 8,124,572 describes a method for producing biofuels and biolubricants from a common feedstock comprising processing a biologically-derived oil to hydrolyze triglycerides and form free fatty acids therefrom; separating the fatty acids to isolate monounsaturated fatty acids; modifying the monounsaturated fatty acids to form an ester product; and hydrotreating the saturated fatty acids and/or polyunsaturated fatty acids to yield alkanes.

SUMMARY

The present disclosure relates to a process for producing a lube base stock from a feedstock derived from natural oil. There is provided a method for co-producing lube basestock and transportation fuel from a feedstock of biological origin, the method comprising: a) converting a feedstock of biological origin to a ketone or a dimer acid in the presence of a first catalyst; and h) hydrogenating the ketone or the dimer acid to produce a hydrocarbon in the presence of a second catalyst comprising a hydrogenation catalyst and a hydrothermally stable binder.

In another embodiment, there is provided a method for co-producing lube basestock and transportation fuel from a feedstock of biological origin in a single reactor, comprising a1) converting a feedstock of biological origin to a fatty acid; a2) coupling two or more fatty acids to form a ketone or a dimer acid; and b) deoxygenating the ketone or the dimer acid to produce a hydrocarbon in the presence of a second catalyst comprising a hydrogenation catalyst and a hydrothermally stable binder, wherein steps a1) and a2) are carried out in the presence of a first catalyst.

In yet another embodiment, there is provided a lube base stock prepared from a biologically derived oil having a viscosity of greater than 4 cSt at 100° C., a viscosity index of at least 90, and a pour point less than 0° C.

In yet another embodiment, there is provided a jet fuel prepared from a biologically derived oil having a freezing point of less than −40° C., a smoke point greater than 25 mm, and a heat of combustion at least 43 kJ/g.

In yet another embodiment, there is provided a diesel fuel prepared from a biologically derived oil having a cloud point of less than −10° C., a cetane number greater than 50, and a heat of combustion at least 40 kJ/g.

DETAILED DESCRIPTION

AU numerical values within the detailed description and the claims herein are modified by "about" or "approximately" the indicated value, and take into account experimental error and variations that would be expected by a person having ordinary skill in the art.

Jet fuel, diesel fuel, and lube basestocks have been conventionally produced from petroleum feedstocks via extensive processing. Recent attention has been given to processing renewable feeds for fuel production. Many natural oils contain triglycerides with fatty acid chains of predominantly 18 carbon number, which fit into the diesel boiling range. Prior efforts, however, focused primarily on production of biodiesel or renewable diesel from natural oils. Thus, it would be advantageous to provide a method for producing transportation fuel and lube basestocks simultaneously.

Figure 1:
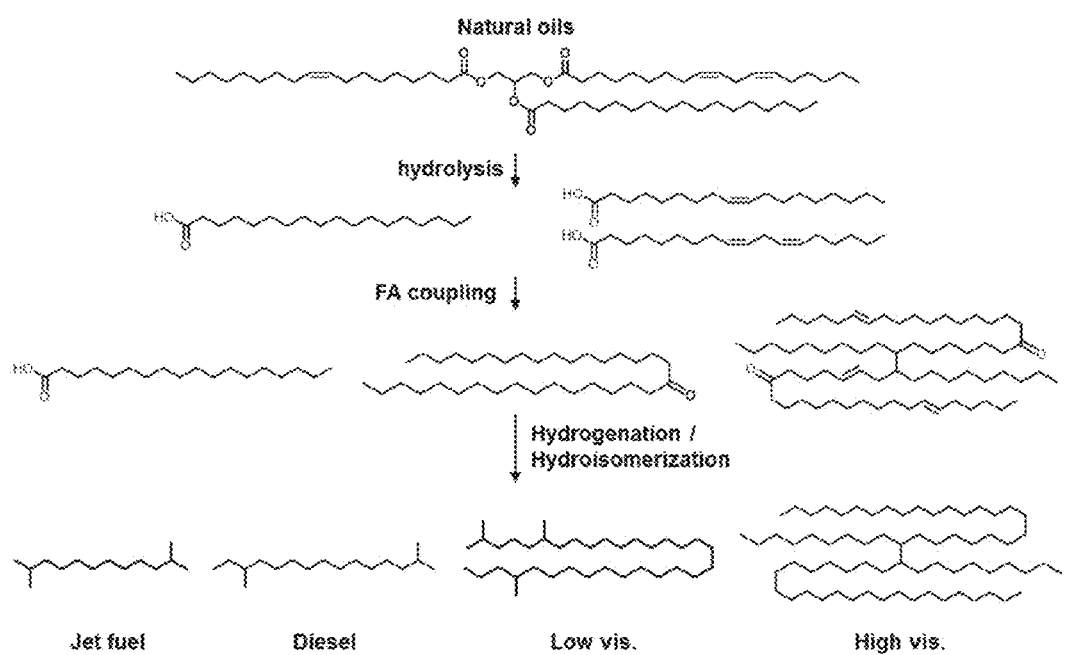
FIG. 1 is a scheme illustrating reactions for co-producing lube basestock and transportation fuel from a feedstock of biological origin occurring under conditions of a first catalyst and a hydrogenation catalyst.

The present disclosure relates to a process for producing lube basestock and transportation fuel simultaneously from a feedstock derived from natural oils. The methods described herein involve contacting a stream of bio feedstocks with a catalyst or a combination of catalysts to produce jet fuel, diesel fuel, low viscosity lube basestocks and/or high viscosity lube basestocks, as shown in FIG. 1. The co-production methods have at least three potential advantages: 1) expanding jet fuel production; 2) satisfying regulatory requirement for renewable diesel; and 3) producing different viscosity basestocks that are not readily available from current processes. In addition to offering high quality products, simultaneous production will not only reduce capital investment but also potentially save on operating cost via process integration.

The present disclosure provides a method for co-producing lube basestock and transportation fuel from a feedstock of biological origin, the method comprising: a) converting a feedstock of biological origin to a ketone or a dimer acid in the presence of a first catalyst; and b) hydrogenating the ketone or the dimer acid to produce a hydrocarbon in the presence of a second catalyst comprising a hydrogenation catalyst and a hydrothermally stable binder. "Hydrocarbon" herein refers to a molecule consisting only of carbon and hydrogen atoms. In various embodiments, the hydrocarbon has from 1 to 300 carbon atoms.

By-products from the method such as, for example, water, can lead to catalyst poisoning and/or contaminant build-up in a reaction system. The method of this disclosure uses a second catalyst comprising a hydrothermally stable binder which is useful to prevent the second catalyst from being deactivated by such excessive by-products. In various embodiments, the hydrothermally stable binder comprises $TiO_2$, $ZrO_2$ or $CeO_2$.

In a particular embodiment, the step a) of the method comprises sub-steps of: a1) converting a feedstock of biological origin to a fatty acid; a2) coupling two or more fatty acids to form a ketone or a dimer acid; and the step b) comprises deoxygenating the ketone or the dimer acid to produce a hydrocarbon in the presence of a second catalyst comprising a hydrogenation catalyst and a hydrothermally stable binder. Furthermore, the step b) may optionally comprise a step of hydroisomerizing or cracking the hydrocarbon produced in step b) to produce lube basestock and transportation fuel containing a diesel fuel or a jet fuel, or both diesel and jet fuel. The methods described herein may further comprise a step of removing undesirable products such as, for example, $H_2O$, $CO_2$ and a light hydrocarbon. The method may comprise further processing steps, such as vacuum distillating and/or hydrofinishing the lube basestock in the presence a hydrofinishing catalyst selected from, for example, the group consisting of noble metals on carbon, silica, alumina and MCM-41 support.

In the methods above, fatty acid coupled products lead to tube basestocks, and uncoupled fatty acids are converted into diesel or jet fuel depending on the number of carbon in the source fatty acids. In addition; cracking of the fatty acid coupled product during dewaxing leads to further formation of diesel and/or jet fuel.

The methods described herein can be carried out either in separate reactors or in a single reactor by employing multiple catalysts. In an embodiment, the process is carried out in a single reactor, using a first catalyst and a second catalyst. The first catalyst catalyzes transformation steps a1) and a2) forming higher oxygenates such as ketones and dimer acids. The second catalyst catalyzes step b) forming the desired products. In some embodiments, catalysts comprising a hydrothermally stable binder such as $TiO_2$, $ZrO_2$, or $CeO_2$ are used as the second catalyst. Fractionation of the hydrocarbon product gives jet fuel, diesel, and basestocks.

In another embodiment, the process is carried out in separate reactors where the first reactor is dedicated to steps a1) and a2). With an intermediate purge of $H_2O$, $CO_2$, and other light products, the liquid product from the first reactor is fed to a second reactor, where the oxygenates are deoxygenated and isomerized. More $H_2O$ and possibly some $CO_x$ ($CO/CO_2$) are formed in the second reactor. Thus, the catalysts need to be stable to this environment at elevated temperature (300° C. and higher). In some embodiments, catalysts comprising a hydrothermally stable binder such as $TiO_2$, $ZrO_2$, or $CeO_2$ are used in the second reactor. Fractionation of the effluent from the second reactor gives desired products.

In another embodiment, there is provided a method for co-producing lube basestock and transportation fuel from a feedstock of biological origin in a single reactor, comprising a1) converting a feedstock of biological origin to a fatty acid; a2) coupling two or more fatty acids to form a ketone or a dimer acid; and b) deoxygenating the ketone or the dimer acid to produce a hydrocarbon in the presence of a second catalyst comprising a hydrogenation catalyst and a hydrothermally stable binder, wherein steps a1) and a2) are carried out in the presence of a first catalyst.

Feedstocks

Feedstocks for the process are drawn either from petroleum sources or from renewable sources of biological origin, e.g., plant, algae or animal (including insect) origin. Animal, algae and plant oils containing tri-glycerides, as well as partially processed oils containing mono-glycerides and di-glycerides are included in this group. Another source of feedstock is phospholipids or saccharolipids containing fatty acid esters in their structure, such as phosphatidyl choline and the like present in plant cell walls. Carbon numbers for the fatty acid component of such feedstocks are generally in the range of $C_{12}$ or greater, up to $C_{30}$.

Other components of the feed can include a) plant fats, plant oils, plant waxes; animal fats, animal oils, animal waxes; fish fats, fish oils, fish waxes, and mixtures thereof; b) free fatty acids or fatty acids obtained by hydrolysis, acid trans-esterification or pyrolysis reactions from plant fats, plant oils, plant waxes, animal fats, animal oils, animal waxes, fish fats, fish oils, fish waxes, and mixtures thereof; c) esters obtained by trans-esterification from plant fats, plant oils, plant waxes, animal fats, animal oils, animal waxes, fish fats, fish oils, fish waxes, and mixtures thereof, d) esters obtained by esterification of free fatty acids of plant, animal and fish origin with alcohols, and mixtures thereof; e) fatty alcohols obtained as reduction products of fatty acids from plant fats, plant oils, plant waxes, animal fats, animal oils, animal waxes, fish fats, fish oils, fish waxes, and mixtures thereof; and f) waste and recycled food grade fats and oils, and fats, oils and waxes obtained by genetic engineering, and mixtures thereof.

Examples of vegetable oils that can be used in accordance with this disclosure include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil. Vegetable oils as referred to herein can also include processed vegetable oil material as a portion of the feedstock. Non-limiting examples of processed vegetable oil material include fatty acids and fatty acid alkyl esters. Alkyl esters typically include $C_1$-$C_5$ alkyl esters. One or more of methyl, ethyl, and propyl esters are desirable.

Examples of animal fats that can be used in accordance with the disclosure include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters, Alkyl esters typically include $C_1$-$C_5$ alkyl esters. In particular embodiments, alkyl esters are one or more of methyl, ethyl, and propyl esters.

Algae oils or lipids can typically be contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 40 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena Phaeodactylum tricornutum, Pleurochrysis carterae, Prymnesium parvum, Tetraselmis chui*, and *Chlamydomonas reinhardtii*. Additional or alternate algal sources can include one or more microalgae of the *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Emiliania, Eremasphaera, Ernodesmius, Euglena, Franceia, Fragilaria, Gloeothamnion, Hematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichoccus, Tetraselmis, Thalassiosira, Viridiella*, and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitierinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema*, and *Xenococcus* species.

Other feeds usable in the present disclosure can include any of those that comprise primarily triglycerides and free fatty acids (FFAs). The triglycerides and FFAs typically contain aliphatic hydrocarbon chains in their structure having from 8 to 36 carbons, particularly from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material is made of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. If triglycerides are present, a majority of triglycerides present in the feed can particularly be comprised of $C_{12}$ to $C_{22}$ fatty acid constituents, based on total triglyceride content. Other types of feed that are derived from biological raw material components can include fatty acid esters, such as fatty acid alkyl esters (e.g., FAME and/or FAEE).

For reactions with feedstocks having a relatively higher degree of unsaturation, an acidic catalyst can be used to promote dimerization and oligomerization. The dimers and oligomers are branched or having cyclic structures, which can be coupled with another carboxylic acid forming ketones of higher carbon numbers. Subsequent hydrogenation under the action of the hydrogenation catalyst produces saturated, branched or cyclized hydrocarbons than can be naturally very low in wax and require little if any dewaxing. If the feedstock is highly saturated, action of a basic catalyst produces straight chain products that are subsequently hydrogenated to relatively straight chain hydrocarbons that normally require some dewaxing to make them suitable lube stocks. Dewaxing can be provided by the hydrogenation catalyst, as further described below.

One method for characterizing the triglycerides in a feedstock is based on the number of carbons in the side chains. While some feedstocks may have consistent numbers of carbons in each side chain, such as in a tristearin feedstock, many types of triglycerides will have variations in chain length between molecules and even within molecules. In order to characterize these variations, the average number of carbons per side chain in the triglycerides can be determined. By definition, a triglyceride contains three side chains. Each side chain contains a number of carbons, as mentioned above. By averaging the number of carbons in each side chain for the triglycerides in a feedstock, an average side chain length can be determined. The average number of carbons (also referred to as average carbon number) per side chain in the feedstock can be used as a comparative value for characterizing products. For example, the average number of carbons per side chain in the feedstock can be compared with the average number of carbons in hydrocarbons generated by converting and/or isomerizing the triglyceride-containing feedstock.

In various aspects, the production of carboxylic acid coupling products and corresponding hydrogenated products is based on processing of triglycerides within the feed. Thus, in some embodiment, the presence of at least some triglycerides within the feed is desirable. The feed can include at least 10 wt % of feed based on a renewable source or sources, such as at least 25 wt %, In particular embodiments, the renewable portion of the feed is at least 50 wt %, or at least 75 wt %, or at least 90 wt %, or at least 95 wt %. Such higher amounts of feed from a renewable source provide an advantage based on the greater amount of renewable material. Additionally or alternately, the feed can be entirely a feed from a renewable source, or the feed can include 99 wt % or less of a feed based on a renewable source, or 90 wt % or less, or 75 wt % or less, or 50 wt % or less.

Higher amounts of feed from a renewable source provide an advantage based on the greater amount of renewable material, as well as potentially including a greater amount of triglycerides. Feeds with lower amounts of renewable materials may have other processing advantages. Such advantages can include improved flow characteristics within a reaction system, as renewable feeds often have a relatively high viscosity compared to conventional diesel or lubricant feeds in a refinery. Additionally, deoxygenation of a renewable feed can generate a substantial amount of heat due to formation of highly favorable products from a free energy standpoint, such as $H_2O$ and $CO_2$. For a typical catalyst bed with a bed length of 25 to 30 feet (9 to 10 meters), it may be preferable to have a temperature increase across the bed of 100° F. (55° C.) or less. If deoxygenation of a renewable feed with high oxygen content is performed using a sufficiently reactive catalyst, an exotherm of greater than 100° F. across the catalyst bed can be generated. Blending a renewable feed with a portion that does not contain oxygen can reduce the exotherm generated across a catalyst bed used for performing deoxygenation.

Thus the feedstock can contain a number of components. It can be supplied as a solution in a suitable solvent (particularly a non-reactive solvent such as a hydrocarbon), or the feedstock can be supplied neat. The main reactions are thought to be coupling or oligomerizing the fatty acid components (which produces intermediate products of suitable carbon number to be useful as lube base stocks upon hydrogenation), and hydrogenating the resulting products to remove functional groups and produce a saturated hydrocarbon.

The feed may contain various amount of mineral feed as diluent. The advantages of increased mineral feed content are largely due to dilution of the renewable feed, as the processing conditions effective for deoxygenation of a renewable feed will have a low or minimal impact on a typical hydroprocessed mineral feed. Therefore, while the deoxygenation conditions are effective for deoxygenation of renewable feeds at a variety of blend ratios with mineral feeds, it may be preferable to have at least 75 wt % of the feed from a renewable source, such as at least 90 wt % or at least 95 wt %.

One option for increasing the renewable content of a feed while retaining some of the benefits of adding a feed with reduced oxygen content is to use recycled product from processing of renewable feed as a diluent. A recycled product from processing a renewable feed is still derived from a renewable source, and therefore such a recycled product is counted as a feed portion from a renewable source. Thus, a feed containing 60% renewable feed that has not been processed and 40% of a recycled product from processing of the renewable feed would be considered as a feed that includes 100% of feed from a renewable source. As an example, at least a portion of the product from processing of a renewable feed can be a diesel boiling range product. Such a recycled diesel boiling range product will be deoxygenated, and therefore incorporation of the recycled diesel boiling range product in the feed will reduce the exotherm generated during deoxygenation. Adding a recycled diesel boiling range product is also likely to improve the cold flow properties of a renewable feed. More generally, any convenient product from processing of a renewable feed can be recycled for blending with the renewable feed in order to improve the cold flow properties and/or reduce the oxygen content of the input flow to a deoxygenation process. If a recycled product flow is added to the input to a deoxygenation process, the amount of recycled product can correspond to at least 10 wt % of the feed to the deoxygenation process, such as at least 25 wt %, or at least 40 wt %. Additionally or alternately, the amount of recycled product in a feed can be 60 wt % or less, such as 50 wt % or less, 40 wt % or less, or 25 wt % or less.

With regard to triglyceride content, the feedstock can include at least 10 wt %, such as at least 25 wt %, and particularly at least 40 wt %, or at least 60 wt %, or at least 80 wt %. Additionally or alternately, the feed can be composed entirely of triglycerides, or the triglyceride content of the feed can be 90 wt % or less, such as 75 wt % or less, or 50 wt % or less. The methods described herein are suitable for conversion of triglycerides to lubricant products, so higher contents of triglycerides may be advantageous. However, to the degree that a recycle loop is used to improve the feed flow properties or reduce the reaction exotherm across catalyst beds, lower triglyceride contents may be beneficial.

While feed dilution can be used to control the exotherm generated across a catalyst bed used for deoxygenation, it is noted that some processing options can also impact the exotherm. One alternative is to use a less reactive catalyst, so that a larger amount of catalyst is needed at a given liquid hourly space velocity (LHSV) in order to deoxygenate a feed to a desired level. Another option is to reduce the amount of hydrogen provided for the deoxygenation process. Still another option could be to introduce additional features into a reactor to assist in cooling and/or transporting heat away from a deoxygenation catalyst bed. In combination with selecting an appropriate amount of product recycle and/or blending of another non-oxygenated feed, a desired combination of a flow characteristics and heat generation during deoxygenation can be achieved.

Oxygen is the major heteroatom component in renewable base feeds. A renewable feedstream based on a vegetable oil, prior to hydrotreatment, includes up to 10 wt % oxygen, for example up to 12 wt % or up to 14 wt %, Such a renewable feedstream, also called a biocomponent feedstream, normally includes at least 1 wt % oxygen, for example at least 2 wt %, at least 3 wt %, at least 4 wt %, at least 5 wt %, at least 6 wt %, or at least 8 wt %, Further, the renewable feedstream, prior to hydrotreatment, can include an olefin content of at least 3 wt %, for example at least 5 wt % or at least 10 wt %.

Biocomponent based feedstreams have a wide range of nitrogen and/or sulfur contents depending on the feed sources. For example, a feedstream based on a vegetable oil source can contain up to 300 wppm nitrogen. In some embodiments, the sulfur content can be 500 wppm or less, for example 100 wppm or less, 50 wppm or less, or 10 wppm or less, where wppm stands for parts per million by weight.

Acidic and Basic Catalysts—Definition

Catalysts that have sufficient acidic or basic properties to be effective in coupling fatty acids, fatty acid esters, fatty alcohols, fatty olefins, or glycerides (mono-, di-, or triglycerides) can be identified by determining the molar ratio of chemisorption of $CO_2$ and $NH_3$ over these materials. $CO_2$, a weak acid, is used to titrate the basic sites present on the catalysts. Likewise, $NH_3$, a strong base, is titrated to indicate the acidic sites on these materials. Many factors determine the actual amount of chemisorption, such as surface area of the material (often significantly affected by the catalyst preparation method), the temperature at which the chemisorption is measured, and the pressure at which the chemisorption is tested. The ratio of adsorbed $CO_2$ and $NH_3$ indicates a relative acidity or basicity.

For the present purposes, a "basic" catalyst is defined as material having a molar ratio of chemisorption of $CO_2$ per gram of material to the chemisorption of $NH_3$ per gram of material greater than 0.5, typically greater than 0.75, and especially greater than 1.0, when tested as described below.

In non-limiting examples, the "carbon dioxide/ammonia ratio" ranges from 1.0 to 100; particularly from 1.0 to 50; or more particularly from 1.0 to 40.

An "acidic" catalyst is defined as catalyst having a carbon dioxide/ammonia ratio of less than 0.5, typically less than 0.3, and especially less than 0.2, when tested as described below. In various embodiments, the values range from 0.05 to 0.5; particularly from 0.05 to 0.3; or more particularly from 0.05 to 0.2.

Determination of carbon dioxide/ammonia ratio (i.e. the molar ratio of chemisorption of $CO_2$ per gram of catalyst to the chemisorption of $NH_3$ per gram of catalyst) is conducted using a Mettler TGA/SDTA 851 thermogravimetric analysis system at ambient pressure. The catalyst sample is calcined in flowing air at 500° C. for three hours or at least until a constant sample weight is obtained. The temperature of the sample is then reduced in flowing air (helium could also be used) to the desired temperature of chemisorption. Next, the sample is allowed to equilibrate at the desired temperature in flowing helium and weighed. Chemisorption of carbon dioxide is measured at 150° C., and chemisorption of ammonia is measured at 250° C. After being weighed, the sample is subjected to a number of pulses (12 seconds/pulse) of gaseous mixture containing helium and either carbon dioxide or ammonia until a constant weight is obtained. The gas mixture contains 10 mole percent carbon dioxide or ammonia with the remainder being helium. After each pulse of the gas mixture being tested, the sample is flushed with flowing helium for 3 minutes. 20 separate pulses of the gas mixture are used in each test. The increase in weight of the sample in terms of mg/g material based on the sample weight after calcination is used to determine the moles of $CO_2$ or $NH_3$ adsorbed per gram of material.

Molar ratios of chemisorption of $CO_2$ to the chemisorption of $NH_3$ per gram of material for some representative catalysts are shown in Table 2.

TABLE 2

| Materials | $CO_2/NH_3$ Chemisorption Molar Ratio |
|---|---|
| MgO (Elastomag 170) | 7.82 |
| MgO (MagChem 200AD) | 6.92 |
| γ-$Al_2O_3$ (Alfa # 43832) | 0.47 |
| Hydrotalcite (Pural MG30) | 1.35 |
| Hydrotalcite (Pural MG63) | 1.95 |
| Hydrotalcite (Pural MG70) | 2.30 |
| W/$ZrO_2$ | 0.07 |
| $La_2O_3$ | 6.64 |
| La/$SiO_2$ | 0.92 |
| $AlPO_x$ | 0.75 |
| $NdAlPO_x$ | 1.04 |
| $YAlPO_x$ | 0.86 |
| $PrAlPO_x$ | 1.05 |
| La/$ZrO_2$ (700° C. calcined) | 1.06 |
| $Y_2O_3$—5% $ZrO_2$ | 6.17 |
| $Y_2O_3$—25% $ZrO_2$ | 1.18 |
| $Nd_2O_3$ | 35.37 |
| $Sm_2O_3$ | 15.61 |
| $Y_2O_3$ | 14.95 |
| $CeO_2$ | 8.48 |
| $Pr_2O_3$ | 1.56 |
| $TiO_2$ | 0.55 |
| $ZrO_2$ | 0.33 |
| SAPO-34 | 0.19 |
| ZSM-5 | 0.16 |
| $SiO_2$ | 0.02 |
| USY | 0.00 |
| 75/25 $SiO_2/Al_2O_3$ | 0.38 |
| 50/50 $SiO_2/Al_2O_3$ | 0.47 |
| 25/25 $SiO_2/Al_2O_3$ | 0.41 |
| 13/87 $SiO_2/Al_2O_3$ | 0.42 |
| $La_2O_3/SiO_2$ | 0.92 |
| MCM-41 | 0.44 |

Catalysts suitable for use to couple fatty acids, fatty acid esters, fatty alcohols, fatty olefins, or glycerides (mono-, di-, or tri-glycerides) are drawn from oxides and mixed oxides of metals of Group 1 to Group 6, Group 12 to Group 15, Lanthanide Series, or Actinide Series of the Periodic Table of Elements. The catalysts can also comprise acidic or basic clays such as hydrotalcites, bentonite, montmorillonite, aluminosilicates such as zeolites, aluminophosphates, or metalloaluminophosphates (where metal is, for example, Si, Nd, Y, Pr, Ce, Ti, or Zr).

In one embodiment, the coupling catalysts comprise two or more metal oxides, particularly one Group 4 metal oxide and one or more selected from Group 2, Group 3, Lanthanide Series, and Actinide Series metal oxides. Yet in another embodiment, the coupling catalysts are selected from oxides of Group 2, Group 12, or Group 13 elements, and mixtures thereof. In another embodiment, the coupling catalysts are either naturally occurring or synthetic clays such as hydrotalcite, bentonite, montmorillonite, or mixtures thereof. Compositions for each individual component in the oxide mixtures can vary within the range of 1-99%. The oxides can be prepared using a variety of methods, although generally they are prepared by converting a suitable precursor by precipitation from solution and/or calcination. Suitable precursors include metal salts, such as halides, sulfates, phosphates, halides, nitrates, hydroxides, oxychlorides, alkoxides, and acetates.

In one embodiment, a metal oxide useful as a catalyst is produced by first preparing a liquid solution comprising a salt of the metal in a solvent, such as water. The resultant solution is then subjected to conditions sufficient to cause precipitation of the solid oxide material, such as by the addition of a precipitating reagent, typically a base such as sodium hydroxide or ammonium hydroxide. The liquid solution is generally maintained at a temperature at or below 200° C. during the precipitation, for example in the range of from 0° C. to 200° C., such as from 20° C. to 100° C. In an embodiment, the resulting gel is hydrothermally treated at a temperature of at least 80° C., particularly at least 100° C., for up to 10 days, such as up to 5 days, for example up to 3 days. The resulting material is then recovered, for example by filtration or centrifugation, washed, and dried. The resulting particulate material is typically then calcined, normally in an oxidizing atmosphere, at a temperature of at least 400° C., such as from 400° C. to 800° C., for up to 48 hours, such as for 0.5 hours to 24 hours, for example for 1 hour to 10 hours.

When two or more metal oxides are used for the coupling of fatty acids, fatty acid esters, fatty alcohols, fatty olefins, or glycerides (mono-, di-, or tri-glycerides), they may either be co-precipitated or precipitated separately and combined with each other at any later stage of processing including as calcined solid particles.

Basic Catalysts

Coupling of fatty acids forming ketones (ketonic decarboxylation), for example, is catalyzed by a component having adequate basicity to catalyze the reaction. They are referred to herein as base catalysts, basic catalysts, basic material, or other similar phrases. It is believed that basic catalysts promote the hydrolysis of triglyceride into fatty acids and the coupling of the fatty acids. Advantageously, catalysis by a basic catalyst or catalyst component leads to coupling of fatty acid components to form chemical species having twice the number of carbons as the starting material fatty acids. This conveniently produces hydrocarbons (after subsequent hydrogenation in the presence of other catalysts) in the $C_{24}$ and higher range that are suitable as lube base stocks.

According to the definitions used here, basic catalysts are a class of materials with the "carbon dioxide/ammonia ratio" in the range of 1-100; particularly from 1.0 to 50; or more particularly from 1.0 to 40. Examples of suitable basic catalyst components include, but are not limited to, basic clays such as a hydrotalcite; an alkali impregnated support such as $K_2CO_3$ on $SiO_2$, $ZrO_2$ or $TiO_2$; a basic metal oxide such as MgO, CaO, BaO, ZnO, and $MnO_2$; rare-earth metal oxides such as $La_2O_3$, $CeO_2$, $Y_2O_3$, $Sm_2O_3$, and $Pr_2O_3$; mixed rare earth metal oxides such as $La_2O_3/ZrO_2$, $ZnO/La_2O_3$, $Y_2O_3/ZrO_2$, $CeO_2/ZrO_2$, and $La_2O_3/SiO_2$; or mixtures thereof.

To convert triglycerides over a base catalyst, a triglyceride-containing feed is exposed to the catalyst under effective conditions to convert triglycerides to fatty acid coupled products. The effective conditions for the triglyceride conversion reaction include a temperature from 300° C. to 450° C. A liquid hourly space velocity of from 0.1 to 10 v/v/h, particularly 0.5 to 5 v/v/h, can be applied. It is not believed that hydrogen gas is required to facilitate the condensation reaction. However, in embodiments where a single reactor is used for both the basic catalyst and the hydrogenation catalyst, hydrogen will typically be present in order to facilitate the hydrogenation reaction. As a result, a hydrogen partial pressure of 1.8 MPag to 34.6 MPag will also typically be present.

Exposure of triglycerides to the base catalyst will generate a mixture of products, with majority products being fatty ketones. It is believed that the fatty ketones are formed via reactions between the fatty acid side chains of the triglyceride.

The basic catalysts according to the disclosure allow for conversion of triglycerides to fatty ketones without requiring addition of water for an initial hydrolysis reaction, although water can be optionally added to the reactor. Instead, exposing a triglyceride-containing feedstock to the base catalysts in the presence of hydrogen allows for conversion of triglycerides to a mixture of ketones.

In a particular embodiment, a catalyst selected for catalyzing the conversion of triglycerides to ketones will remain stable in the reaction environment. The conversion of triglycerides to ketones using a base catalyst results in some production of water, so catalysts that deteriorate in water may pose some difficulties in scaling up a process for commercial use.

Acidic Catalysts

Fatty acid coupling can also be catalyzed by a catalyst component having adequate acidity to catalyze the conversion chemistry. They are referred to herein as acid catalysts, acidic catalysts, acidic material, or other similar phrases. According to the definitions used here, acidic catalysts are a class of materials with the "carbon dioxide/ammonia ratio" in the range of 0.05 to 0.5; particularly from 0.05 to 0.3; or more particularly from 0.05 to 0.2. Examples of acid catalyst include but are not limited to large pore zeolites (e.g., Faujasite, Beta, and the MWW families), medium (10-ring) to small (8-ring) pore zeolites (e.g., MFI, CHA, MOR, etc.) with small particle sizes, acidic mixed metal oxides ($WO_x/ZrO_2$, $MoO_x/ZrO_2$), alumina, silica-alumina, and acidic clays, or mixtures thereof.

Although the acidic catalysts can perform other functions in the complicated one step conversion of feedstock to lube base stock, a key function is to catalyze the reaction of unsaturated fatty acids to make dimers and higher oligomers of fatty acids. For this reason, the acidic catalysts can be referred to as oligomerization catalyst. Oligomerization reactions are carried out with suitable catalysts at high temperature. Suitable catalysts include molecular sieves (both aluminosilicate zeolites and silicoaluminophosphates), metalloaluminophosphates, amorphous aluminosilicates, cationic acidic clays, and other solid acid catalysts or mixtures thereof. According to International Zeolite Association (IZA) definitions, molecular sieves can be categorized according to the size of the pore opening Examples of the molecular sieves can be of the large (>12-ring pore opening), medium (10-ring opening) or small (<8-ring pore opening) pore type. The molecular sieves structure types can be defined using three letter codes. Non-limiting examples of small pore molecular sieves include AEI, AFT, ANA, APC, ATN, ATT, ATV, AWW, BIK, CAS, CHA, CHI, DAC, DDR, EDI, ERI, GIS, GOO, KFI, LEV, LOY, LTA, MER, MON, PAU, PHI, RHO, ROG, SOD, THO, and substituted forms thereof. Non-limiting examples of medium pore molecular sieves include AFO, AEL, EUO, HEU, FER, MEL, MFI, MTW, MTT, MWW, TON, and substituted forms thereof. Non-limiting examples of large pore molecular sieves include BEA, CFI, CLO, DNO, EMT, FAU, LTL, MOR and substituted forms thereof. In one embodiment, zeolite catalysts have a Si/Al molar ratio of greater than 2 and at least one dimension of the pore openings greater than or equal to 10-ring. In a particular embodiment, solid zeolites for some embodiments include ZSM-5 (MFI), zeolite beta (BEA), USY family zeolites (FAU), MCM-22, MCM-49, and MCM-56 (MWW). Mesoporous materials with pore openings greater than 20 angstroms, such as the MCM-41 family and SBA-15 type with aluminum incorporated into the structure and thus possessing acidity, can also be used as oligomerization catalysts.

Another class of acidic materials is metalloaluminophosphates (MeAPO), where the metal is selected from silicon; transition metal elements such as Ti, Zr, Fe, Co, Ni, Cu and Zn; and rare-earth elements such as Y, La, Ce, Pr, Nd, Sm and Gd. Acidic clays include acidic, natural or synthetic montmorillonites, bentonite, silica clay, alumina clay, magnesia clay, and silica-alumina clay. Commercially available acidic forms of Filtrol clays are also suitable.

Other solid acid catalysts, such as acidic mixed metal oxides $WO_3/ZrO_2$ and $MoO_3/ZrO_2$, other metal oxides such as sulfated zirconia, $SiO_2/ZrO_2$, $Al_2O_3/ZrO_2$, $MgO/SiO_2$, and Nafions or other acidic ion-exchanged resins such as Dowex and Amberlyst cation exchanged resin are also suitable for the oligomerization reaction.

The acid catalysts according to the disclosure allow for conversion of triglycerides to fatty acid dimers and oligomers without requiring addition of water for an initial hydrolysis reaction, although water can be optionally added to the reactor. Instead, exposing a triglyceride-containing feedstock to the acid catalysts in the presence of hydrogen allows for conversion of triglycerides to a mixture of fatty acid dimers and oligomers.

In cases where starting materials of biological origin are used for the production of base oils, it is necessary to extend the hydrocarbon chain length to reach the carbon number range required in the base oil applications, leaving predominantly carbon-carbon bonds in the main structure of the molecule. According to the disclosure, this is carried out by allowing the feed containing triglycerides to react over an acid catalyst, thus yielding hydrocarbons with carbon numbers in the range from $C_{18}$ to $C_{180}$. In base oil applications, the carbon number range is typically from $C_{18}$ to $C_{144}$. In the reaction, the triglycerides are hydrolyzed in-situ generating fatty acids. The fatty acids, particularly unsaturated fatty acids, are oligomerized, thus forming oligomers of fatty acids. For lube base oil applications, dimers of fatty acids are desirable, although trimers and tetramers are also formed and may be used to make high viscosity basestocks. In case the feedstock contains polyunsaturated hydrocarbon chains, after oligomerization, greater amounts of trimers and higher oligomers may form and may contain ring structures.

With acidic catalysts, it is advantageous to use feed stock containing higher than 20% mono-unsaturated acid or ester, alternatively, higher than 40%, alternatively, higher than 50%, alternatively higher than 60% mono-unsaturated acid or ester. Mixed unsaturated acid or esters, containing $C_{12}$, $C_{14}$, $C_{16}$, $C_{18}$, $C_{20}$, $C_{22}$, or $C_{24}$ unsaturated acid and/or esters can be used as feed. In some embodiments, the combination of the acids is chosen to give the average carbon number of feeds in the range of $C_{14}$ to $C_{22}$. This range of feed is most likely to produce final lube base stock with viscosity ranging from 3 cSt at 100° C. to 100 cSt at 100° C.

The acid catalyzed coupling reactions are carried out at suitable temperatures, for example 150° C. to 400° C., 200° C. to 400° C., or 250° C. to 350° C. A liquid hourly space velocity of from 0.1 to 10 v/v/h, particularly 0.5 to 5 v/v/h, is applied. It is not believed that hydrogen gas is required to facilitate the condensation reaction. However, in embodiments where a single reactor is used for both the acid catalyst and the hydrogenation catalyst, hydrogen will typically be present in order to facilitate the hydrogenation reaction. As a result, a, hydrogen partial pressure of 1.8 MPag to 34.6 MPag will also typically be present. The presence of hydrogen may reduce the cyclic oligomer formation. This is beneficial for production of high paraffinic hydrocarbons at the end of the conversion.

Hydrogenation Catalyst

After carboxylic acid coupled products are formed from triglycerides or other components of a feedstock, a second catalyst is used to hydrogenate them. Particularly, the second catalyst is also suitable for isomerizing the resulting hydrogenated molecules where needed. An additional consideration in selecting a second catalyst is that the catalyst should be stable in the presence of water, due to the water generated during conversion of the triglycerides to ketones.

The hydrogenation catalyst promotes the reaction of hydrogen with olefinic unsaturation in the ketones, heavier oxygenates, and other intermediate reaction products. It further acts to reduce carbonyl, carboxyl, hydroxyl, and other oxygen containing groups to provide the deoxygenated hydrocarbons as reaction products. Working in concert with the basic coupling catalysts, it also provides isomerization functionality, helping to introduce sufficient branching in the final hydrocarbon products, where needed, to give basestocks with suitable pour point and low temperature properties.

Catalysts suitable for hydrogenation reaction include metals such as Mo, Re, Fe, Ru, Co, Rh, Ir, Ni, Pd, Pt, Cu, Zn, as well as binary or ternary mixtures thereof supported on silica, alumina, titania, zirconia, clays such as Kieselguhr, amorphous aluminosilicates, or zeolites. For example, the catalysts include Mo, Co, Ni, Pd, Pt, and binary or ternary mixtures thereof supported on silica, alumina, amorphous aluminosilicates, clays, or Kieselguhr. In an embodiment, the catalysts are Ni supported on Kieselguhr, CoMo on gamma-alumina, and NiMo on gamma-alumina. Metal content in the catalyst ranges from 0.1 wt % to 70 wt % of the catalyst.

In one embodiment, a hydrogenation catalyst is made of a transition metal and an acidic component as support. Non-limiting examples include Ni, Co, Pd, Pt, Ru, Rh, Co—Mo, and Ni—Mo, particularly supported on an inorganic support such as alumina, amorphous aluminosilicates, acidic clays or zeolites. The acidity of the support helps introducing branching, such as methyl branching, to long-chain hydrocarbons, thus isomerizing the long-chain hydrocarbons. With the metal hydrogenation functionality and the acidic component isomerization functionality, this type of catalyst is sometimes referred to as hydroisomerization catalyst. Non-limiting examples of the hydroisomerization catalyst include metals supported on zeolites, such as noble metals on 10-ring uni-dimensional zeolites, including Pt, Pd, or a mixture thereof for the metal and ZSM-22, ZSM-23, ZSM-35, ZSM-4, ZBM-30 or ZSM-48 for the zeolite. Other zeolites that can be used include, but are not limited to, the MCM-22 family of zeolites, beta zeolite, USY family zeolite and mordenite.

Hydrogenation catalysts having hydroisomerization functionality are sometimes referred as dewaxing catalysts in the art. The dewaxing catalyst comprises a metal hydrogenation component, an acidic component such as zeolites, and a binder.

Examples of suitable hydrogenation catalysts that have a dewaxing effect comprise zeolites as the acidic component that performs dewaxing primarily by isomerizing a hydrocarbon feedstock. These hydrogenation catalysts may be preferred for use in conjunction with a basic catalyst, which tends to produce ketone intermediates that are relatively unbranched. In an embodiment, the zeolites have a uni-dimensional (or one dimensional) pore structure. Exemplary one-dimensional zeolites include ZSM-22, ZSM-12, ZSM-23, ZSM-4, ZSM-48, and ZSM-50.

Suitable zeolites include 10-member ring pore zeolites, such as EU-1, ZSM-35 (or ferrierite), ZSM-11, ZSM-57, NU-87, SAPO-11, and ZSM-22. In particular embodiments, suitable zeolites include EU-2, EU-11, IBM-30, ZSM-48, and ZSM-23. In some particular embodiments, zeolite is ZSM-48. Note that a zeolite having the ZSM-23 structure with a silica to alumina ratio of from 20:1 to 40:1 can sometimes be referred to as SSZ-32. Other molecular sieves that are iso-structural with the above materials include Theta-1, NU-10, EU-13, KZ-1 and NU-23.

Particularly, the hydrogenation catalysts used in processes according to the disclosure have a zeolite component with a low ratio of silica to alumina. For example, for ZSM-48, the ratio of silica to alumina in the zeolite can be less than 200:1, or less than 110:1, or less than 100:1, or less than 90:1, or less than 80:1. In various embodiments, the ratio of silica to alumina is from 30:1 to 200:1, 60:1 to 110:1, or 70:1 to 100:1.

The hydrogenation catalysts with dewaxing for use with basic catalysts also include a metal hydrogenation component. The metal hydrogenation component is typically a Group VI and/or a Group VIII metal. In various embodiments, the metal hydrogenation component is a Group VIII noble metal. In non-limiting fashion, the metal hydrogenation component is Pt, Pd or a mixture thereof. In another embodiment, the metal hydrogenation component is a combination of a non-noble Group VIII metal and a Group VI metal. Suitable combinations include Ni, Co or Fe with Mo or W, particularly Ni with Mo or W.

The metal hydrogenation component may be added to the catalyst in any convenient manner. One technique for adding the metal hydrogenation component is by incipient wetness. For example, after combining a zeolite and a hydrothermally stable binder, the combined zeolite and binder are extruded into catalyst particles. The catalyst particles are exposed to a solution containing a suitable metal precursor containing the Group VI or Group VIII metal. Alternatively, metal can be added to the catalyst by ion exchange, where a metal precursor is added to a mixture of zeolite (or zeolite and binder) prior to extrusion.

In various embodiments, the amount of metal in the catalyst is at least 0.1 wt % based on catalyst, at least 0.15 wt %, at least 0.2 wt %, at least 0.25 wt %, at least 0.3 wt %, or at least 0.5 wt % based on catalyst. In exemplary fashion, the amount of metal in the catalyst is 20 wt % or less based on catalyst, 10 wt % or less, 5 wt % or less, 2.5 wt % or less, 1 wt % or less. For embodiments where the metal is Pt, Pd, another Group VIII noble metal, or a combination thereof, the amount of metal is from 0.1 to 5 wt %, from 0.1 to 2 wt %, from 0.25 to 1.8 wt %, or from 0.4 to 1.5 wt %, in non-limiting examples. For embodiments where the metal is a combination of a non-noble Group VIII metal with a Group VI metal, the combined amount of metal is from 0.5 wt % to 20 wt %, or 1 wt % to 15 wt %, or 2.5 wt % to 10 wt %, by way of non-limiting example.

Hydrothermally Stable Binders and Hydrogenation Catalysts

In various embodiments, a second catalyst comprises a hydrogenation catalyst which is bound using a binder to increase mechanical strength and stability of the catalyst in the presence of water under effective hydrogenation conditions. Such a binder is referred to herein as a hydrothermally stable binder. Non-limiting examples of suitable binders are refractory oxides such as silica, alumina, silica-alumina, titania, zirconia, ceria, and mixtures thereof.

In particular embodiments, a hydrothermally stable binder is selected from metal oxides such as titanium oxides, zirconium oxides, cerium oxides, or a combination thereof (e.g., $TiO_2$, $CeO_2$ and a mixture thereof). In some embodiments, the catalyst for hydrogenation and isomerization includes a binder material that provides enhanced activity and/or stability for hydrogenation and isomerization, such as a titania binder.

Optionally, the hydrogenation catalysts are formulated using a low surface area binder, where a low surface area binder is one with a surface area of 100 $m^2/g$ or less, 80 $m^2/g$ or less, or 70 $m^2/g$ or less. In various embodiments, the binder and the zeolite particle size are selected to provide a catalyst with a desired ratio of micropore surface area to total surface area. In hydrogenation catalysts used according to the disclosure, and in exemplary fashion those used along with a basic material as coupling catalyst, the micropore surface area corresponds to surface area from the unidimensional pores of zeolites in the hydrogenation catalyst. The total surface corresponds to the micropore surface area plus the external surface area. Any binder used in the catalyst will not contribute to the micropore surface area and will not significantly increase the total surface area of the catalyst. The external surface area represents the balance of the surface area of the total catalyst minus the micropore surface area. Both the binder and zeolite can contribute to the value of the external surface area. In particular embodiments, the ratio of micropore surface area to total surface area for a hydrogenation catalyst will be equal to or greater than 25%.

A zeolite can be combined with a binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

In yet another embodiment, a binder composed of a mixture of two or more metal oxides is used. In the case where the two or more metal oxides of the binder have different surface areas, the weight percentage of the binder with lower surface area may be greater than the weight percentage of the binder having higher surface area. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. In one example, a first binder is mixed with the zeolite during formation of the zeolite powder, such as during spray drying. The spray dried zeolite/binder powder is then mixed with the second metal oxide binder prior to extrusion.

Reaction Conditions and Process Configurations

The methods of this disclosure can be carried, out stepwise using mufti-reactors or in a single reactor. In a particular embodiment, reaction of the feedstock with the catalysts or catalyst components is conveniently carried out in a single reactor, without the necessity of isolating and purifying the product of reaction steps, as necessitated by the multi-reactor processes of the prior art. It has been found that reaction proceeds from feedstock to lube base stock hydrocarbon under a single set of pressure, temperature, and time conditions in the presence of hydrogen. The process simplifies production of basestocks from renewable feeds in that only a single reactor is dealt with.

In particular embodiments for carrying out the reaction, a layered bed or a stacked catalyst bed is used. In this configuration, a first catalyst that is mainly responsible for coupling the carboxylic acids to produce molecules of suitable carbon number is disposed in the reactor so as to conic into contact with the feedstock before the reacted feedstock contacts the second catalyst (the hydrogenation catalyst). Flow of the reacting material over the catalysts is controlled by varying the pressure, feed rate, and other parameters. Residence time for contact with the catalyst compositions is naturally controlled in the same way. In various embodiments, the method is adapted for batch-wise or for continuous production of lube base stock.

Hydrogen can be present throughout the reactor, and is consumed by the reactants during the hydrogenation step. Advantageously, it was found that the presence of hydrogen did not adversely affect the carboxylic acid coupling reactions believed to be catalyzed primarily by the basic catalysts. During the fatty acid coupling, hydrogen transfer reactions can lead to formation of coke molecules, which can cause catalyst deactivation. In various embodiments, the presence of hydrogen can inhibit hydrogen transfer and improve catalyst life.

Temperature and pressure of the reactor and reactants is selected depending on the throughput and turnover required. Non-limiting examples of temperatures include 100 to 500° C., 200 to 400° C., and 250 to 400° C. Hydrogen partial pressure is used in the range of from 1.8 to 34.6 MPag (250 to 5,000 psig) or 4.8 to 20.8 MPag, by way of non-limiting example. Also in non-limiting fashion, a liquid hourly space velocity is from 0.2 to 10 v/v/hr, or 0.5 to 3.0, and a hydrogen circulation rate is 35.6 to 1781 $m^3/m^3$ (200 to 10,000 scf/B), particularly 178 to 890.6 $m^3/m^3$ (1000 to 5000 scf/B). Further non-limiting examples of conditions are given in working examples. In particular embodiments, the method is carried out in a batch or flow reactor at a temperature of 275 to 400° C., pressure of 300 to 700 psig, and a liquid hourly space velocity of 0.1 to 10 v/v/h under static or flowing gas comprising $N_2$ or $H_2$.

Loading of the catalyst is 1 to 30% by weight of the weight of the feedstock in the reactor, for example, 2 to 20%, or 5 to 10% by weight. The reaction time or residence time can range from 5 minutes to 50 hours depending on types of catalysts used, reaction temperature and the amount (wt %) of catalyst in the reactor. In a particular embodiment, a residence time is 10 minutes to 10 hours. Shorter residence time gives better efficiency for reactor usage. Longer residence time ensures high conversion to pure hydrocarbons. Usually an optimized reactor time is most desirable.

In various embodiments, the duration of the reaction (or the average residence time in the reactor for a continuous process) is 1-48 hours, 1-20 hours, 12-36 hours, or 24-30 hours. In various embodiments, the reactions are carried out in a fixed bed reactor, a continuous stir tank reactor, or a batch reactor. In any of these operations, it is advantageous to maintain partial pressure of hydrogen above 300 psi, above 400 psi, above 500 psi, above 600 psi, or above 700 psi. During conversion, carbon dioxide and water generated from the action of the acidic or basic catalyst on the feedstock are present in gaseous form, and thus increase the total reactor pressure. Under this condition, it can be important to maintain hydrogen partial pressure. By way of non-limiting example, this can be achieved by intermittently purging the reactor gas and re-charging with hydrogen gas in batch or CSTR operation. Alternatively, in a fixed bed operation, this can be achieved by withdrawing reactor gas at different locations along the fixed bed reactor; or alternatively by stage injection of hydrogen. Other means to maintain hydrogen pressure are also possible.

In an embodiment, a method of this disclosure is carried out with a basic catalyst selected from $La_2O_3/ZrO_2$, $La_2O_3/ZnO$ and $Y_2O_3/ZrO_2$, where the La content is 5 to 10 wt % in the mixture, and a hydrogenation catalyst which is Pt supported on ZSM-48 with a binder selected from $TiO_2$, $ZrO_2$ and a mixture thereof (0.3 to 1% Pt on the catalyst) or ZSM-48/$NiWO_x$ (20 to 40% $NiWO_x$) at a temperature of 300 to 400° C. under $H_2$ partial pressure of 500 to 800 psig.

There are several alternatives for how to incorporate the hydrogenation catalyst in the reaction system. One option is to configure the carboxylic acid coupling catalyst and the hydrogenation catalyst as stacked beds. In this type of configuration, a reactor or reaction system will contain one or more initial beds of carboxylic acid coupling catalyst for converting the feed to one or more of ketones, heavier oxygenates. As described above, exposing a carboxylic acid such as fatty acid or triglyceride-containing feed to the one or more initial beds of carboxylic acid coupling catalysts (first catalyst) will result in production of an effluent containing ketones or heavier oxygenates. The effluent containing these oxygenates is then exposed to one or more beds of a hydrogenation catalyst under effective hydrogenation conditions. This can result in hydrogenation of products formed by the action of the first catalyst.

Where needed, the hydrogenation catalyst can introduce branches into the final hydrocarbon products to provide a dewaxing function. For feeds containing triglycerides with only saturated fatty acid side chains, the combination of coupling fatty acids with other carboxylic acids and hydrogenation may give relatively unbranched hydrocarbons. For feeds containing triglycerides with both saturated and unsaturated fatty acid side chains, the combination of coupling fatty acids with other carboxylic acids and hydrogenation will give mixtures of branched hydrocarbons (containing one or more branches of various lengths in the range of 1 to 10 carbons) and naphthenics substituted with various lengths of hydrocarbon chains. Of course, if the side chains of the triglycerides contain other types of heteroatoms, such as nitrogen or sulfur, other types of molecules may be generated.

An alternative configuration is to combine both the carboxylic acid coupling catalyst and the hydrogenation catalyst in the same catalyst bed. In this type of configuration, both the coupling catalyst and the hydrogenation catalyst are exposed to the initial feed. In this type of configuration, some amount of the initial triglycerides in the feed will be converted to diesel boiling range molecules. This is believed to be due to the ability of the hydrogenation catalyst to deoxygenate the side chains of the triglycerides (or of an intermediate product of the triglycerides, such as fatty acids) before reaction to form carboxylic acid coupled products can occur.

Figure 5:
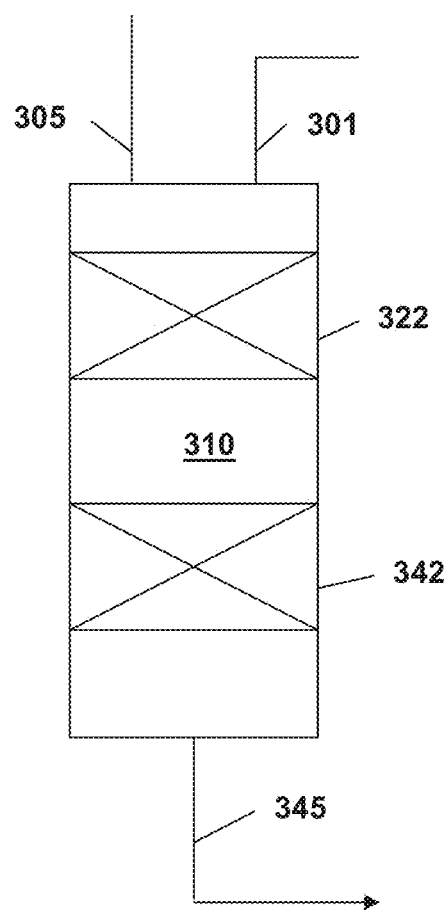
FIG. 5 shows a scheme of a reaction system suitable for performing a process according to an aspect of the disclosure.

FIG. 5 schematically illustrates an example of a reactor suitable for the processes described herein. In FIG. 5, reactor 310 is shown as containing reaction zones 322 and 342. Each reaction zone can correspond to one or more catalyst beds. Alternatively, one or more reactors may be used in a cascade configuration, and any convenient number of reaction zones may be used within a reactor.

Figure 4:
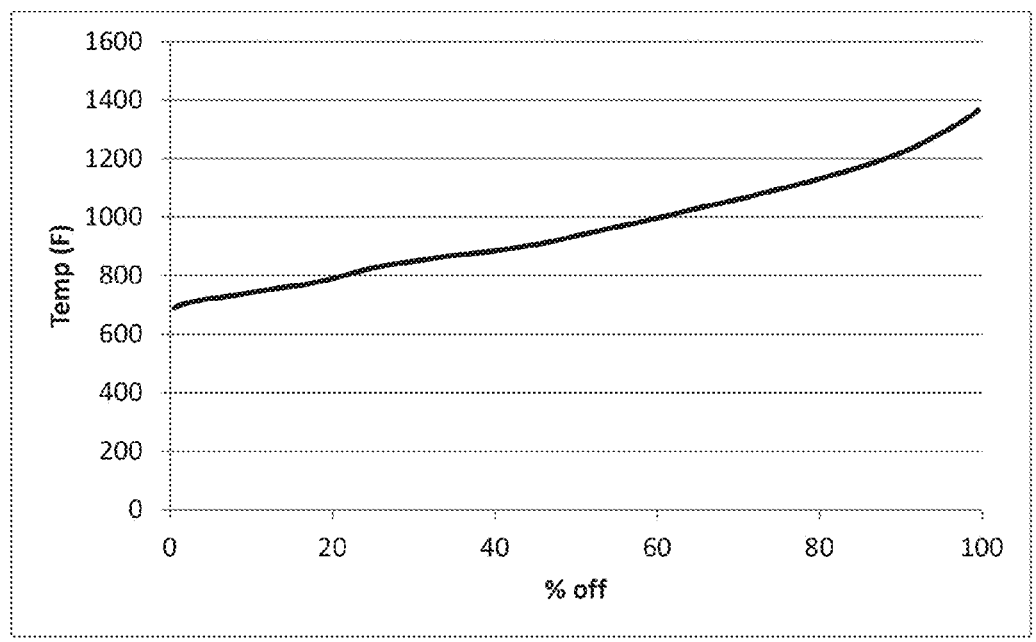
FIG. 4 is a chart showing simulated distillation (SIMDIS) curves of the basestock fraction produced by a method of the present disclosure, as described in Example 6.

In stacked bed configuration, reaction zone 322 can contain one or more catalyst beds of a basic catalyst. The feedstock 305 is introduced into reactor 310 so that the feedstock is exposed to the catalyst in the catalyst beds in reaction zone 322 prior to being exposed to the catalyst in reaction zone 342. In FIG. 4, hydrogen treat gas 301 is shown as entering reactor 310 in a co-current manner relative to the flow of the feedstock 305. Alternatively, hydrogen treat gas can be introduced into reactor 310 in other convenient manners, such as introducing the hydrogen treat gas to flow counter-current relative to feedstock 305.

After passing through reaction zone 322, the effluent is exposed to the catalyst in the one or more catalyst beds in reaction zone 342. Depending on the configuration, reaction zone 342 is an optional reaction zone. For example, in a configuration where only mixed beds of catalyst are used, only a single reaction zone 322 may be needed. The effluent from reaction zone 342 (or optionally reaction zone 322) then exits the reactor as a product effluent flow 345.

In one type of stacked bed configuration, the one or more catalyst beds in reaction zone 322 corresponds to a basic catalyst, while the one or more catalyst beds in reaction zone 342 correspond to a hydrogenation catalyst. In another type of stacked bed configuration, one or both of reaction zones 322 and 342 can contain mixed beds of a basic catalyst as well as a hydrogenation catalyst. In this type of configuration, the volume percentage of the hydrogenation catalyst is greater in the catalyst beds in reaction zone 342 as compared to the volume percentage of hydrogenation catalyst in the catalyst beds in reaction zone 322.

Still another option is to have a uniform mixture of hydrogenation catalyst and a basic catalyst within the reaction zones in the reactor, in this type of configuration, reaction zone 342 is optional, as the same or similar conditions are present throughout the reactor. Thus, all catalyst beds within the reactor can alternatively be thought of as being in reaction zone 322.

Further Processing

The product of the reaction described herein is a mixture of hydrocarbons having a carbon number in the lube base stock range and the transportation fuel range. After fractionation, the lube fraction, if desired, can be hydrofinished by subjecting it to low pressure hydrogen over a hydrofinishing catalyst. This process can clean up residual oxygenates and olefinic unsaturates that may result when the products are being heated in the presence of the hydrogenation catalyst, which can have cracking functionality given that it may contain an acidic carrier such as a zeolite. The hydrofinishing can be carried out either in a fixed-bed or in an autoclave reactor. The catalyst can be either noble metal (Pd, Pt, Rh, Ru, Ir, or combination thereof) or non-noble metal Co, Ni, Fe), particularly supported on a support such as clay, alumina, aluminosilicate, silica, titania and zirconia. The weight hourly space velocity can be in the range of 0.5 to 10 $h^{-1}$, under a hydrogen pressure in the range of ambient to 30 MPag, and a temperature from 150° C. to 400° C.

The lube fraction can be further fractionated to obtain desired viscosity grades. Vacuum distillation is used to obtain, for example, 4 cSt, 6 cSt, 10 cSt and intermediate and higher viscosity grades (kinematic viscosity at 100° C.). Typical columns have multiple trays (about 15) with internal recycle and product pump-around for 2 to 5 product draws. Following distillation, additional hydrofinishing can be used to improve stability and obtain "white oils".

Products: Lube Basestock and Transportation Fuel

This disclosure also provides various products prepared by the methods described herein, for example, lube basestock and transportation fuel. In an embodiment, there is provided lube basestock prepared by a method of this disclosure using a biologically derived oil. Lube base stock and transportation fuel such as jet fuel and diesel fuel "prepared from a biologically derived oil", as used herein, refer to products synthesized from renewable sources of biological origin. The terms are intended to exclude products derived from petroleum or crude oil. The product of the catalytic reactions described herein comprises hydrocarbons in the lube base stock range (above $C_{20}$, for example $C_{28}$ or higher such as $C_{28}$-$C_{300}$), with co-products in the diesel fuel ($<C_{20}$) range. The basestock has pour point between 0° C. and −80° C., particularly between −10° C. and −80° C., more particularly between −20° C. and −80° C. The basestock has a kinematic viscosity Kv100 of 3 to 100 cSt, and a viscosity index between 90 and 160.

The basestock is significantly free of carbonyl groups as measured by Infrared (IR) spectroscopy, that is, there is no peak in the 1600-1800 $cm^{-1}$ region. The product is also significantly free of vinylic hydrogen as measured by Nuclear Magnetic Resonance (NMR) spectroscopy. In the $^1H$ NMR spectrum, the vinylic hydrogen is less than 1%, particularly less than 0.5%, more particularly less than 0.3% of total hydrogen. The basestock is substantially free of oxygen; with an oxygen content of less than 50 ppm, particularly less than 20 ppm, more particularly less than 10 ppm. The oxygen content is generally lower than those of known biologically produced basestock products. As a lube stock, the product can be formulated with conventional lube additives such as antiwear agents, antioxidants, VI improvers, biocides, preservatives, extreme pressure additives, and the like to formulate lubricant compositions. In a particular embodiment, a lube stock has a viscosity of greater than 4 cSt at 100° C., a viscosity index of at least 90, and a pour point less than 0° C.

In another embodiment, there is provided jet fuel prepared by a method of this disclosure using a biologically derived oil which has a freezing point of less than −40° C., a smoke point greater than 25 mm, and a heat of combustion at least 43 kJ/g. In some particular embodiments, the jet fuel produced from the biologically derived oil is substantially free of sulfur (from 0.1 to 15 ppm), has a freeze point of less than 47° C., contains less than 25 vol. % aromatics and most preferably less than 10% aromatics. The jet fuel produced is substantially free of oxygen; with an oxygen content of less than 50 ppm, particularly less than 20 ppm, more particularly less than 10 ppm. The oxygen content is generally lower than those of known biologically produced jet fuel products.

In yet another embodiment, there is provided diesel fuel prepared by a method of this disclosure using a biologically derived oil has a cloud point of less than −10° C., a cetane number greater than 50, and a heat of combustion at least 40 kJ/g. In some particular embodiments, the diesel fuel produced from the biologically derived oil is substantially free of sulfur (e.g., from 0.1 to 15 ppm sulfur), has a pour point from −20° C. to −40° C., and a cetane number from 50 to 70. Unlike conventional biodiesel such as fatty acid methyl esters (FAME), the diesel fuel of this disclosure is substantially free of oxygen; with an oxygen content of less than 50 ppm, particularly less than 20 ppm, more particularly less than 10 ppm. The oxygen content is generally lower than those of known biologically produced diesel fuel products.

Two-Dimensional Gas Chromatography (GC×GC) Characterization of Renewable Basestock Chemical Composition Comprehensive two-dimensional gas chromatography (GC×GC) is a separation technique developed in recent years. It can provide improved chromatographic resolution of complex mixtures. GC×GC employs a single GC unit containing two separation columns of different selectivity. A modulation unit situated between these two separation columns performs solute focusing and re-injection into a short, high-speed second column. The modulation mechanism is the key to accomplish this two-dimensional separation. GC×GC may be considered as a 'continuous' heart-cutting form of a conventional single heart cutting multidimensional GC that has been established for many years.

Compositions for the fuel products are determined by GC×GC. In a particular embodiment, the jet fuel produced by the process of this disclosure comprises 1 to 25% aromatics, 20 to 40% naphthenes, and 40 to 80% paraffins. In another particular embodiment, the diesel fuel produced by the process of this disclosure comprises 1 to 25% aromatics, 20 to 40% naphthenes, and 40 to 80% paraffins.

The origin of the basestocks and fuels produced by the process of this disclosure can be determined by the radioactive carbon $^{14}C$ level. $^{14}C$ radioactive carbon is produced in the atmosphere by collisions between cosmic-ray neutrons and $^{14}N$, after which it is quickly oxidized to $CO_2$. Plants take up the $^{14}CO_2$ for photosynthesis, and consequently they reflect "modern" levels of $^{14}C$. Once assimilation of $^{14}C$ ceases, levels of $^{14}C$ decrease through radioactive decay with a half-life of 5730 years. Hence, petroleum, which forms over millions of years, contains no detectable $^{14}C$. Therefore, $^{14}C$ is an ideal tracer for tracing the biological component in base-stock and fuel blends because all recent natural products are effectively pre-labeled with $^{14}C$. The $^{14}C$ level in the basestock and fuels produced by the process of this disclosure is about 99 to 101% of present day $^{14}C$ level. When used in blends with petroleum derived basestocks or fuels, the $^{14}C$ level in the blended basestock and fuels is in the range of 2 to 101% of present day $^{14}C$ level.

EXAMPLES

Example 1

Catalytic Conversion of Soybean Oil Forming Ketones and Higher Oxygenates

Figure 2:
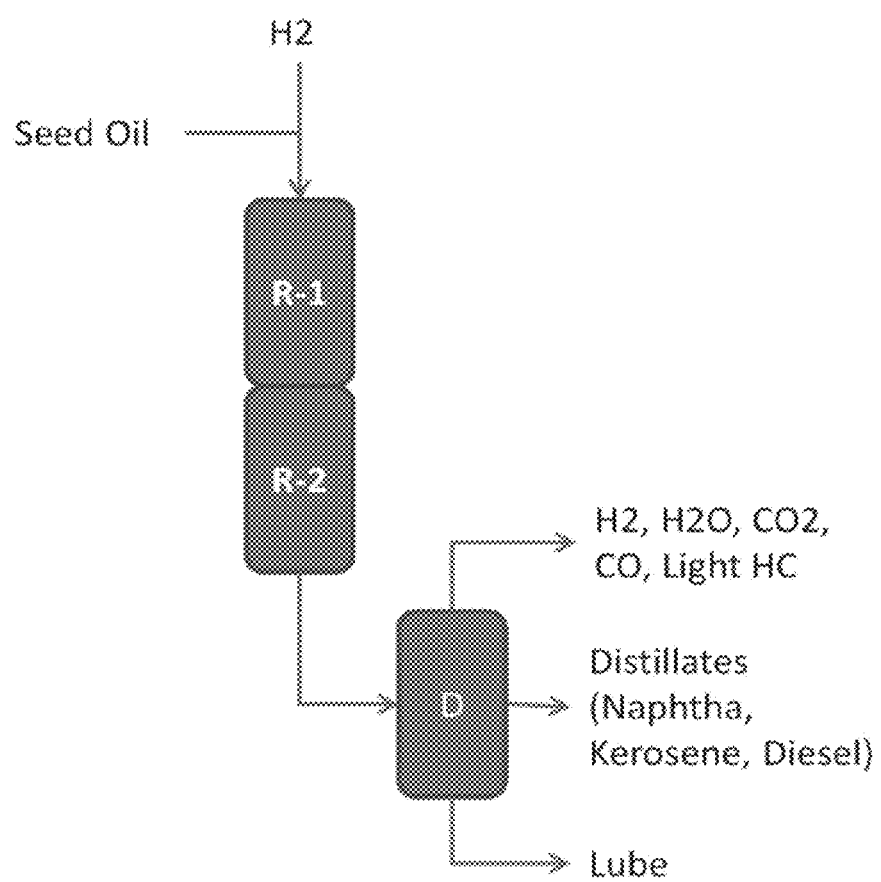
FIG. 2 is a scheme illustrating a reactor used in a conversion process of soybean oil forming ketones and higher oxygenates (Example 1).

In a fixed-bed reactor (⅜" OD) was loaded: Catalyst 1) 5.0 g La/ZrO$_2$ (containing 7% La, purchased from MELChemicals, Flemington, N.J.) sized to 14-20 mesh; and Catalyst 2) 0.6% Pt on ZSM-48 bound with alumina (1/16" extrudate cut to L/D about 1). Catalyst 2 was loaded at the bottom of the reactor; and Catalyst 1 was at the top. The two catalyst beds were separate by 0.5 cc of sand. The reactor was assembled and placed in a three-zone furnace. The catalyst was pre-treated at 350° C. under flowing H$_2$ (100 cc/min) for 2 hours, then neat soybean oil (refined and bleached, purchased from Binge North America) was fed to the reactor at a rate of 1.0 cc/h with a H$_2$ flow of 25 cc/min (down-flow mode). The reaction was run for a period of six weeks; and the H$_2$ flow rate was doubled every two weeks (eventually raised to 100 cc/min). The liquid product was collected and used in Example 2, The reactor scheme is shown in FIG. 2.

Example 2

Deoxygenation of Fixed-Bed Product from Example 1

An amount of 1.50 g of the liquid product from Example 1 was loaded into a 300-cc autoclave, together with 7.5 g of a hydrofinishing catalyst ("MaxSat", Pt—Pd/MCM-41, crushed to powder). The autoclave was heated at 325° C. for 4 days under a H$_2$ flow rate of 100 cc/min. Progress of the reaction was monitored by IR spectroscopy. At the end of the run, no band in the region of 1,700-1,750 cm$^{-1}$ was seen, indicating complete deoxygenation of the feed.

Example 3

Kugelrohr Distillation of Hydrocarbon Product from Example 2

The hydrocarbon product from Example 2 was subjected to Kugelrohr distillation (single stage flash at 180° C., 1 Torr) to separate into a top portion (76%) and a bottom portion (24%). The top portion was subjected to further fractionation as shown in Example 5. The bottom portion has the following properties: 0.62 mol % aromatic H by $^1$H NMR; 2.7 mol % aromatic C by $^{13}$C NMR; N=1.9 ppm; S<0.2 ppm; KV40=110.2 cSt; KY 100=13.67 cSt (VI=124); pour point: 2° C.

Example 4

Further Hydroisomerization of the Kugelrohr Bottom from Example 3 to High Viscosity Basestock The Kugelrohr bottom from Example 3 was added to an autoclave and mixed with 5 wt % of a hydroisomerization catalyst (0.6% Pt on ZSM-48 bound with alumina, crushed to powder). The mixture was heated at 325° C. under 100 cc/mill of flowing H$_2$ for 24 hours. The product was recovered and light ends removed via Kugelrohr distillation. The bottom obtained was suitable as high viscosity basestock: KV40=211.1 cSt; KV100=17.75 cSt (VI=90); pour point: −41° C.

Example 5

Spinning-Band Distillation of the Kugelrohr Top from Example 3 to Obtain Jet Fuel and Diesel Fuel The top portion from Example 3 was subjected to spinning-band distillation in order to obtain jet fuel and diesel fuel. The data are shown in Table 3 below. The naphtha appears to be suitable for reforming. The jet fraction approaches Jet A specifications. The diesel fraction had excellent cetane number. The bottom fraction has properties consistent with the lube bottom of Example 3.

TABLE 3

|  | Charge | IBP/ 330° F. | 330/ 550° F. | 550/ 612° F. | 612° F.+ |
|---|---|---|---|---|---|
| Mass | 62.4 g | 10.0 g | 24.4 g | 19.9 g | 7.1 g |
| Pot Temp. | — | 532° F. | 430° F. | 537° F. | — |
| Pressure | — | ATM | 50 mmHg | 50 mmHg | — |
| Fraction |  | Naphtha | Jet fuel | Diesel | Basestock |
| Yield on charge |  | 16% | 39% | 32% | 11% |
| Yield on TLP |  | 12% | 30% | 24% | 8% |
| Density (g/mL) |  | 0.7924 | 0.818 | 0.8276 |  |
| Pour pt (° C.) |  |  | −45 | −20 | −5 |
| Cloud pt (° C.) |  |  | −36.5 | −13.9 | 0.2 |
| Smoke pt (mm) |  |  | 25.0 |  |  |
| Cetane number |  |  | 55.9 | 65.8 |  |
| KV40 (cSt) |  |  |  |  | 17.06 |

Figure 3:
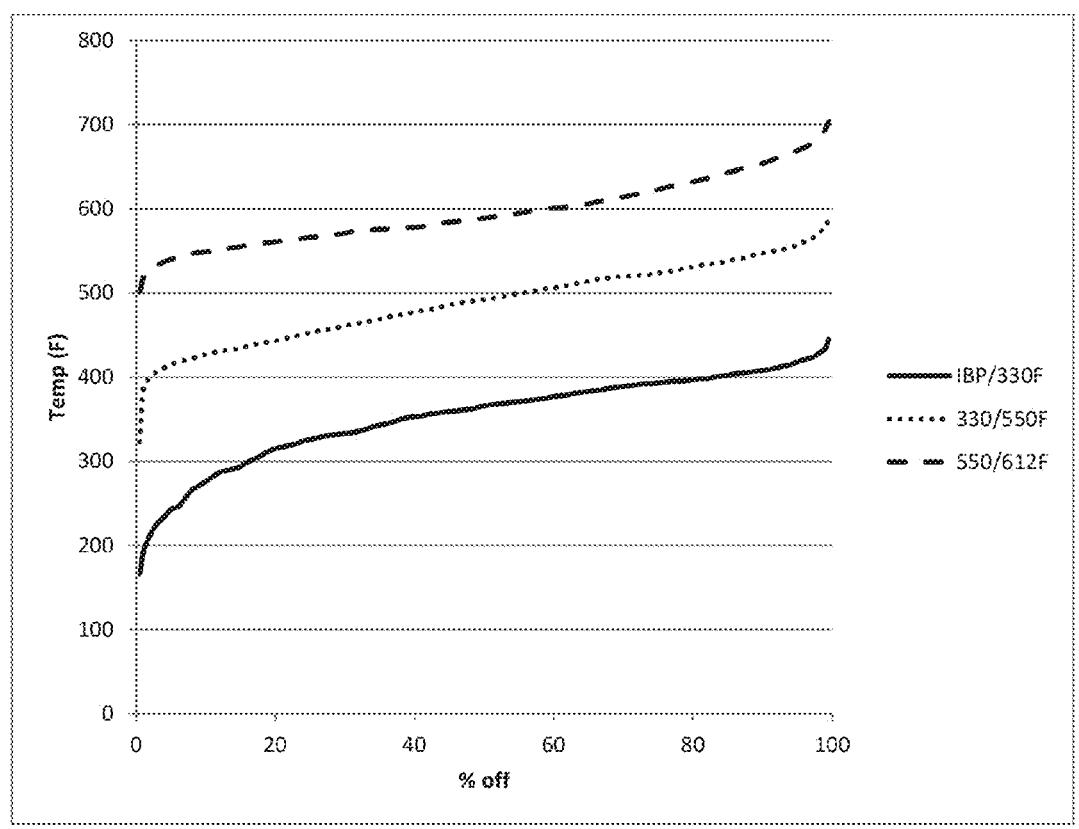
FIG. 3 is a chart showing simulated distillation (SIMDIS) curves of naphtha, jet fuel, and diesel fractions produced by a method of the present disclosure, as described in Example 5.

The SIMDIS profiles for the naphtha, jet fuel, and diesel fractions are shown in FIG. 3. The results indicate that the distillation fractions were cut slightly high relative to the desired boiling range. Fuel properties would be expected to improve when the products are distilled more precisely.

Example 6

Production of Fuel and Basestock from Palm Oil

In a fixed-bed reactor (⅜" OD) was loaded 5.0 g La/ZrO$_2$ (containing 7% La, purchased from MELChemicals, Flemington, N.J.) sized to 14-20 mesh. The reactor was assembled and placed in a three-zone furnace. The catalyst was dried at 350° C. under flowing N$_2$ (100 cc/min) for 2 hours, then neat palm oil (refined and bleached, purchased from Bunge North America) was fed to the reactor at a rate of 1.0 cc/h with a H$_2$ flow of 25 cc/min (down-flow mode) at a temperature of about 384° C. The reaction was run for a period of six weeks and the liquid product was collected. An amount of 144 g of the liquid product was mixed with 7.5 g of 0.6% Pt on ZSM-48 bound with alumina (crushed to powder) and loaded into a 300-cc autoclave. The autoclave was heated at 325° C. for 24 hours under a H$_2$ flow rate of 100 cc/min. At the end of the run, no band in the region of 1,700-1,750 cm$^{-1}$ was seen, indicating complete deoxygenation of the feed. The liquid product was recovered and fractionated to yield the following: 2% naphtha (IBP −330° F.), 16% jet fuel (330° F. to 550° F.), 19% diesel (550° F. to 654° F.), and 63% basestock (654° F.+). The simulated distillation curve is shown in FIG. 4.

The fuel compositions from Example 6 are shown in Table 4, along with comparative samples derived from petroleum sources.

TABLE 4

| Composition | Jet fuel (Example 6) | Kero-jet (petro, comparative) | Diesel (Example 6) | Diesel (petro, comparative) |
|---|---|---|---|---|
| Paraffins | 48.35 | 46.23 | 47.02 | 28.57 |
| Naphthenes | 31.01 | 28.61 | 36.04 | 22.16 |
| Aromatics | 25.16 | 20.64 | 16.94 | 49.28 |

The Examples above demonstrate simultaneous production of jet fuel, diesel, and different viscosity basestocks from a common renewable feed.

Staging of the reactions with interstage separation of the gaseous products, including water, carbon dioxide, carbon monoxide and light hydrocarbons from the La/$ZrO_2$ type hydrolysis-coupling catalyst (R-1) are expected to improve the performance of the second stage dual functional Pt/ZSM-48 hydroisomerization catalyst (R-2) as illustrated in FIG. 2. Hydrofinishing of the lube range products using a Pt—Pd/MCM-41 catalyst (not shown), followed by vacuum distillation (D) leads to high quality lube basestocks of the desired viscosity, for example, a 4 to 6 cSt vacuum distillate and a higher viscosity vacuum bottom product.

Further improvement is anticipated by operating the hydrolysis-coupling reactor at partial conversion of the feed followed by distillation to obtain a ketone rich fraction and recycle of the unconverted triglycerides. The ketone rich fraction is hydroisomerized and hydrofinished to obtain a premium lube fraction of lower viscosity.

All documents described herein are incorporated by reference herein, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Likewise, the term "comprising" is considered synonymous with the term "including" for purposes of Australian law.

When numerical lower limits and numerical upper limits are listed herein, ranges from any lower limit to any upper limit are contemplated.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

What is claimed is:

1. A method for co-producing lube basestock and transportation fuel from a feedstock of biological origin in a single reactor, the method comprising:
    a) converting a feedstock of biological origin to a ketone in the presence of a first catalyst and a hydrogen partial pressure of at least 250 psig, wherein the first catalyst comprises a basic catalyst comprising $CeO_2$; and
    b) hydrogenating the ketone to produce a hydrocarbon in the presence of a second catalyst comprising a hydrogenation catalyst and a hydrothermally stable binder, and wherein the hydrocarbon is a lube basestock and a transportation fuel, and wherein the feedstock of biological origin comprises one or more components selected from the group consisting of a fatty acid, a fatty acid ester, a fatty alcohol, a fatty olefin, a mono-glyceride, a di-glyceride, a tri-glyceride, a phospholipid and a saccharolipid.

2. The method according to claim 1, wherein the step a) is carried out by:
    a1) converting a feedstock of biological origin to fatty acids; and
    a2) coupling two or more of the fatty acids to form a ketone.

3. The method according to claim 2, wherein the coupling produces $H_2O$, $CO_2$, and/or a light hydrocarbon and further comprising the removing $H_2O$, $CO_2$ and/or a light hydrocarbon.

4. The method according to claim 1, wherein the step b) further comprises a hydroisomerization or cracking step to produce the lube basestock and transportation fuel.

5. The method according to claim 4, wherein the transportation fuel comprises a diesel fuel and a jet fuel.

6. The method according to claim 4, further comprising: hydrofinishing the lube basestock in the presence of a hydrofinishing catalyst, followed by vacuum distillation.

7. The method according to claim 6, wherein the hydrofinishing catalyst comprises one or more noble metals supported on a support comprising carbon, silica, alumina, MCM-41, or a combination thereof.

8. The method according to claim 1, wherein the hydrothermally stable binder comprises $TiO_2$, $ZrO_2$, $CeO_2$, or a combination thereof.

9. The method according to claim 1, wherein the feedstock of biological origin is selected from the group consisting of rapeseed oil, soy bean oil, palm oil, camelina oil, jatropha oil, jojoba oil, fish oil, lard, beef tallow, and algae oil.

10. The method according to claim 1, comprising providing the feedstock of biological origin as a solution in a hydrocarbon solvent.

11. The method according to claim 1, comprising contacting the feedstock of biological origin sequentially with the first catalyst in a first zone of the reactor and with the hydrogenation catalyst in a second zone of the reactor.

12. The method according to claim 1, wherein the first catalyst has a ratio of $CO_2$ chemisorption per gram of basic material to $NH_3$ chemisorption per gram of basic material in the range of 1-100.

13. The method according to claim 1, wherein the hydrogenation catalyst comprises a noble metal supported on a zeolite.

14. The method according to claim 1 wherein the hydrogenation catalyst comprises a metal hydrogenation component, the metal hydrogenation component comprising Ni, Co, Pd, Pt, Ru, Rh, Co—Mo, Ni—Mo, Ni—W, Co—W, or a combination thereof, the metal hydrogenation component being supported on an inorganic support comprising silica, alumina, titania, zirconia, zeolites, or combinations thereof.

15. The method according to claim 13, wherein the hydrogenation catalyst comprises Pt supported on the zeolite.

16. The method according to claim 15, wherein the zeolite comprises framework $SiO_2/Al_2O_3$ ratio greater than 50:1.

17. The method according to claim 13, wherein the hydrogenation catalyst comprises beta zeolite, USY family zeolite, mordenite, MCM-41, ZSM-22, ZSM-12, ZSM-23, ZSM-4, ZSM-48, ZSM-50, or a combination thereof.

18. The method according to claim 1,
wherein the hydrogenation catalyst is Pt supported on ZSM-48 or ZSM-48/NiWO$_x$,
wherein the hydrothermally stable binder is TiO$_2$, ZrO$_2$, or a mixture thereof, and
wherein both the converting and the hydrogenating are each carried out at a temperature of from 300 to 400° C. under an H$_2$ partial pressure of from 500 to 800 psig.

19. The method according to claim 1, wherein the first catalyst further comprises an acidic material.

20. The method according to claim 19, wherein the acidic material is selected from the group consisting of an acidic clay, alumina, an aluminosilicate, a metalloaluminophosphate and a mixture thereof.

21. The method according to claim 19, wherein the acidic material is selected from the group consisting of an acidic metal oxide, a mixed metal oxide, WO$_3$/ZrO$_2$, MoO$_3$/ZrO$_2$, a zeolite of the faujasite, beta, or MWW family, 10-ring zeolite, 8-ring zeolite, a metalloaluminophosphate comprising Si, Ti, Zr, Fe, Co, Ni, Cu, Zn, Y, La, Ce, Pr, Nd, Sm or Gd.

22. The method according to claim 19, wherein the second catalyst comprises Ni, Co, Pd, Pt, Ru, Rh, Co—Mo, Ni—Mo, Ni—W, Co—W, or a combination thereof supported on silica, alumina, titania, zirconia, a zeolite, or a combination thereof.

23. The method according to claim 22, wherein the second catalyst comprises a hydroisomerization catalyst comprising Pt supported on a zeolite.

24. The method according to claim 19, wherein the acidic material comprises Montmorillonite, bentonite, WO$_x$/ZrO$_2$, or a combination thereof,
wherein the hydrogenation catalyst comprises a) Ni, Pd, or a combination thereof supported on silica, carbon, or a combination thereof; b) Co—Mo, Co—W, or a combination thereof supported on gamma-alumina; or c) Ni—Mo, Ni—W, or a combination thereof supported on gamma-alumina,
wherein the hydrothermally stable binder comprises TiO$_2$, ZrO$_2$ or a mixture thereof, and
wherein both the converting and the hydrogenating are each carried out at a temperature of from 250° C. to 350° C. under an H$_2$ partial pressure of from 500 psig to 2,000 psig.

25. A method for co-producing lube basestock and transportation fuel from a feedstock of biological origin in a single reactor, comprising
a1) converting a feedstock of biological origin to a fatty acids, wherein the feedstock of biological origin comprises one or more components selected from the group consisting of a fatty acid, a fatty acid ester, a fatty alcohol, a fatty olefin, a mono-glyceride, a di-glyceride, a tri-glyceride, a phospholipid and a saccharolipid;
a2) coupling two or more of the fatty acids to form a ketone in the presence of a first catalyst, wherein the first catalyst comprises a basic catalyst comprising CeO$_2$; and
b) deoxygenating the ketone to produce a hydrocarbon in the presence of a second catalyst comprising a hydrogenation catalyst and a hydrothermally stable binder, and wherein the hydrocarbon is a lube basestock and a transportation fuel,
wherein steps a1) and a2) are carried out at a hydrogen partial pressure of at least 250 psig.

26. The method according to claim 25, wherein the step b) further comprises a hydroisomerization or cracking step to produce the lube basestock and transportation fuel.

27. The method according to claim 25, wherein the method further produces H$_2$O, CO$_2$, and/or a light hydrocarbon and further comprising removing the H$_2$O, CO$_2$ and/or a light hydrocarbon.

28. The method according to claim 25, wherein the first catalyst further comprises an acidic catalyst selected from the group consisting of WO$_3$/ZrO$_2$; MoO$_3$/ZrO$_2$; a large pore zeolite selected from the group consisting of faujasite, beta and MWW families; 8- to 10-ring zeolite having a framework of MFI, CHA, MOR, or a combination thereof; and a metalloaluminophosphate comprising Si, Ti, Zr, Fe, Co, Ni, Cu, Zn, Y, La, Ce, Pr, Nd, Sm or Gd.

29. The method according to claim 25, wherein the hydrothermally stable binder comprises TiO$_2$, ZrO$_2$, CeO$_2$, or a combination thereof.

30. The method according to claim 25, wherein the second catalyst comprises a metal hydrogenation component selected from the group consisting of Ni, Co, Pd, Pt, Ru, Rh, Co—Mo, Ni—Mo, Ni—W, and Co—W and wherein the metal hydrogenation component is supported on a zeolite selected from the group consisting of MCM-41, ZSM-22, ZSM-12, ZSM-23, ZSM-4, ZSM-48 and ZSM-50.

31. A lube base stock prepared from a biologically derived oil having a viscosity of 4 to 100 cSt at 100° C., a viscosity index of 90 to 160, an oxygen content of less than 10 ppm and a pour point of less than 0° C., the lube base stock prepared by a method comprising:
a) converting a feedstock of biological origin to a ketone in the presence of a first catalyst and a hydrogen partial pressure of at least 250 psig, wherein the first catalyst comprises a basic catalyst comprising CeO$_2$; and
b) hydrogenating the ketone to produce a hydrocarbon in the presence of a second catalyst comprising a hydrogenation catalyst and a hydrothermally stable binder, and wherein the hydrocarbon is a lube basestock, and wherein the feedstock of biological origin comprises one or more components selected from the group consisting of a fatty acid, a fatty acid ester, a fatty alcohol, a fatty olefin, a mono-glyceride, a di-glyceride, a tri-glyceride, a phospholipid and a saccharolipid, wherein steps a) and b) are carried out in a single reactor.

32. A jet fuel prepared from a biologically derived oil having a freezing point of less than −40° C., a smoke point greater than 25 mm, an oxygen content of less than 10 ppm, and a heat of combustion of at least 43 kJ/g, the jet fuel prepared by a method comprising:
a) converting a feedstock of biological origin to a ketone in the presence of a first catalyst and a hydrogen partial pressure of at least 250 psig, wherein the first catalyst comprises a basic catalyst comprising CeO$_2$; and
b) hydrogenating the ketone to produce a hydrocarbon in the presence of a second catalyst comprising a hydrogenation catalyst and a hydrothermally stable binder, and wherein the hydrocarbon is a jet fuel, and wherein the feedstock of biological origin comprises one or more components selected from the group consisting of a fatty acid, a fatty acid ester, a fatty alcohol, a fatty olefin, a mono-glyceride, a di-glyceride, a tri-glyceride, a phospholipid and a saccharolipid, wherein steps a) and b) are carried out in a single reactor.

33. The jet fuel of claim 32, wherein the jet fuel comprises 1 to 25% aromatics, 20 to 40% naphthenes, and 40 to 80% paraffins.

34. A diesel fuel prepared from a biologically derived oil having a cloud point of less than −10° C., a cetane number greater than 50, an oxygen content of less than 10 ppm, and a heat of combustion of at least 40 kJ/g, the diesel fuel prepared by a method comprising:
   a) converting a feedstock of biological origin to a ketone in the presence of a first catalyst and a hydrogen partial pressure of at least 250 psig, wherein the first catalyst comprises a basic catalyst comprising $CeO_2$; and
   b) hydrogenating the ketone to produce a hydrocarbon in the presence of a second catalyst comprising a hydrogenation catalyst and a hydrothermally stable binder, and wherein the hydrocarbon is a diesel fuel, and wherein the feedstock of biological origin comprises one or more components selected from the group consisting of a fatty acid, a fatty acid ester, a fatty alcohol, a fatty olefin, a mono-glyceride, a di-glyceride, a tri-glyceride, a phospholipid and a saccharolipid, wherein steps a) and b) are carried out in a single reactor.

35. The diesel fuel of claim 34, wherein the diesel fuel comprises 1 to 25% aromatics, 20 to 40% naphthenes, and 40 to 80% paraffins.

\* \* \* \* \*